June 26, 1951  N. E. STARKEY ET AL  2,558,592
PRIME MOVER REGULATOR
Filed March 30, 1949  2 Sheets-Sheet 1

Fig. 1.

Inventors:
Neal E. Starkey;
Carl B. Lewis,
Martin A. Edwards,
by *Pronell S Mack*
Their Attorney.

Patented June 26, 1951

2,558,592

UNITED STATES PATENT OFFICE 2,558,592

PRIME MOVER REGULATOR

Neal E. Starkey, Schenectady, N. Y., Carl B. Lewis, North East, Pa., and Martin A. Edwards, Scotia, N. Y., assignors to General Electric Company, a corporation of New York Application March 30, 1949, Serial No. 84,416

14 Claims. (Cl. 290—2)

Our invention relates to hydraulic electrical regulating systems and is of particular use in connection with gas-turbine-electric locomotives.

The power output characteristics of a gas turbine differ widely from the load characteristics of the electric generator required in combination with one or more electric motors to form an electrical "transmission" for a gas-turbine-electric propulsion system such as in a locomotive. While somewhat analogous problems have been met in the past in connection with Diesel electric drives, the gas turbine is capable of delivering a great deal more power than the electric equipment can possibly handle and such is not always the case with a Diesel engine. Furthermore, the output of a gas turbine varies greatly as a function of ambient temperature and this is not so markedly true of the Diesel engine. Other control problems (such as those presented due to variation in speed, load, and grade of fuel) are also more difficult to meet in connection with gas turbine electric drives, yet it is desirable to meet these problems in order to take advantage of the simplicity, smaller size, and greater efficiency of the gas turbine and also take advantage of the fact that the gas turbine makes practical the use of considerably heavier and less expensive fuel oil than could possibly be used in a Diesel engine.

In the operation of gas turbine power plants a major consideration is to permit free differential expansion between relative parts without producing undesirable deformations. Because of the extremely high temperatures to which the parts are necessarily subjected, it is necessary to use special high temperature resisting materials such as various stainless steels which have a coefficient of expansion in the neighborhood of twice that of ordinary mild steel with the result that utilization of such materials magnifies the problems resulting from differential thermal expansion. It is, therefore, necessary to provide temperature limits above which the gas turbine cannot operate. It is also necessary to provide temperature limits below which the turbine cannot operate since the characteristics of a gas turbine engine are affected by the ambient temperature of the great quantities of air supplied thereto. At the lower temperatures the air supplied to the turbine is very dense. Unless some provision is made for reducing the maximum speed at which the turbine and compressor may operate at low temperatures, too much air will be supplied to the compressor and to the turbine and set up damaging stresses therein.

It is desirable that any system designed for regulating a gas-turbine-electric power system should provide automatic regulation to secure maximum utilization of power available, to prevent overloading the driven electrical equipment, to provide compensation for many variable quantities including temperature, to control fuel consumption accurately and effectively, and to provide maximum economy and optium operating characteristics at any given operator's throttle position.

It is an object of the present invention to provide means for overcoming the above-mentioned difficulties.

It is a further object of the present invention to provide an improved hydraulic-mechanical-electrical control system which is reliable, easy to operate, and possesses a very rapid rate of response.

It is a still further object of the present invention to provide, for a gas turbine electric drive, a hydraulic-electric control system which permits use of the lowest possible engine speed commensurate with power requirements thereby to minimize engine wear and fuel consumption.

It is another object of the present invention to provide for a gas-turbine-electric locomotive, a hydraulic-electrical regulating system which provides engine speed regulation to compensate for engine speed changes due either to load changes or to throttle position changes and does this accurately and efficiently and without hunting.

Another object of the present invention is to provide regulating equipment which will recalibrate engine speed allowed as a function of ambient temperature, for although a gas turbine is characterized by having a higher output at low ambient temperature, at these low temperatures the stresses in the compressor blading dangerously increase as the temperature is decreased.

It is another object of the present invention to provide for a gas turbine engine a maximum temperature limit control in combination with a rate of change of temperature control, whereby the maximum temperature control will reduce fuel when the maximum temperature has been reached while the rate of change of temperature control will allow sudden changes of temperature as long as the increase or decrease of temperature is within limits specified by the turbine designer.

It is further an object of the present invention to provide a system of programming engine speed changes responsive to throttle handle changes, to minimize rate of speed change and thereby minimize turbine temperature changes responsive to speed changes.

Other objects and advantages will become apparent and the invention will be better understood from consideration of the following description taken in connection with the accompanying drawing in which.

Broadly, the means employed in the embodiment herein illustrated and described comprises a speed-measuring means, load control, fuel control, suitable stabilizing means, a power servo mechanism, maximum temperature control, and maximum rate of change of temperature control.

Figure 1:
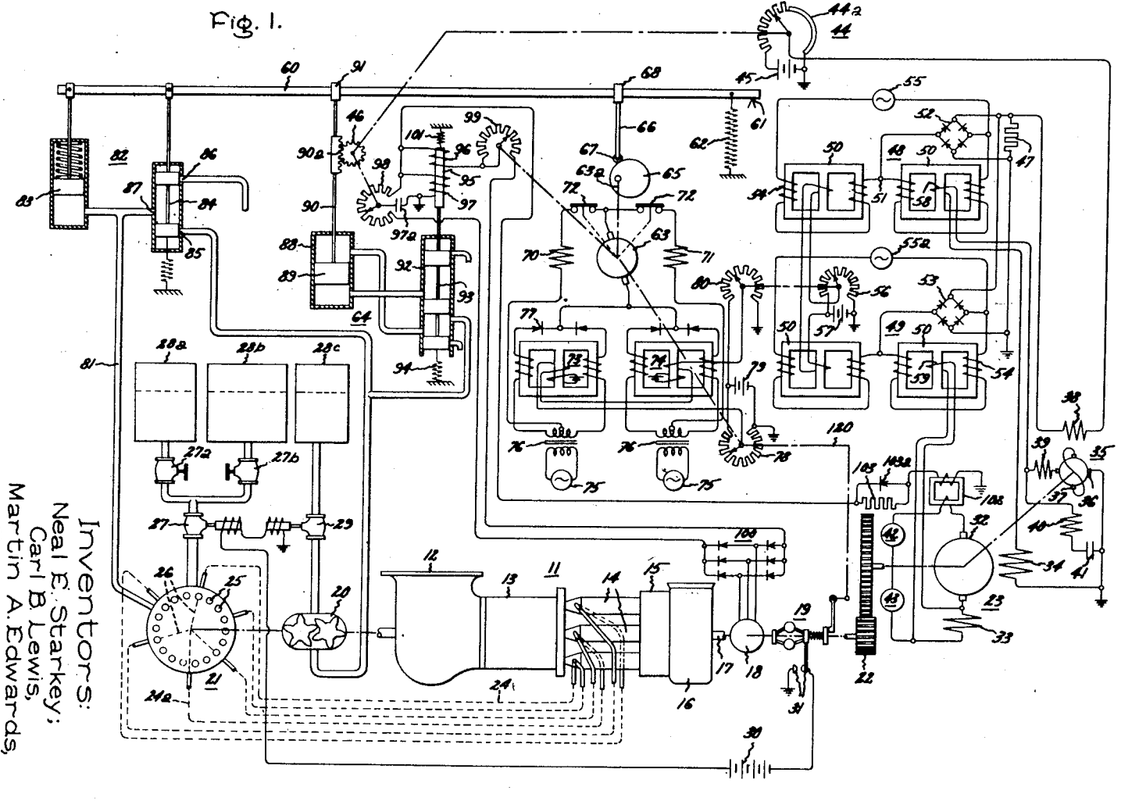
Fig. 1 is a simplified schematic diagram of the hydraulic, mechanical, electrical and fuel connections of a regulating system for a gas turbine electric drive such as would be useful in connection with the propulsion of a locomotive.

In Fig. 1 we have shown a gas turbine type power plant generally indicated at 11 and comprising an inlet casing 12, an axial flow compresser 13, a plurality of combustion chambers 14, a turbine 15, an exhaust casing 16, and an output shaft 17. Such a gas turbine is adequately detailed and described in U. S. patent application No. 754,002, filed June 11, 1947, in the names of Alan Howard, Chester S. Rice, and Bruce O. Buckland, and assigned to the assignee of the present invention.

The central shaft 17 is adapted to drive a tachometer generator 18, an over-speed governor 19, a control oil pump 20, and a fuel oil pump 21. These accessories may be driven by suitable gearing (not shown). Shaft 17 also drives a main gear 22 to provide speed reduction for driving a main generator represented generally at 23. It should be understood that a single gas turbine engine may be used to drive a plurality of main generators although for the purposes of simplicity only a single such generator is shown in the drawing.

Inasmuch as the fuel rate in a gas turbine power plant of the type described must be varied continuously over a wide range (of the order of 1 to 20) from idling to full load operation, fuel pump 21 may desirably be of the variable stroke, positive displacement type described and claimed in co-pending application No. 718,580, filed December 26, 1946, in the names of Donald E. Garr and Martin A. Edwards and assigned to the assignee of the present invention. However, while the pump 21 is of the same general type as the hydraulic wobble pump disclosed in that application, a locomotive gas turbine (as compared with an aircraft gas turbine for which the pump of application 718,580 was originally designed) presents certain additional difficulties in that it is of considerably larger size and likely to be afforded considerably less maintenance and adjustment. Consequently, and as an improvement on the pump of the above-mentioned application, it is desirable to have the pump have a set of a multiplicity of pistons or vanes (for example, at least three pistons or vanes per combustion chamber) and to provide separate conduits from pump to each combustor. As shown in the attached drawing, the six combustion chambers 14 have their nozzles supplied by six conduits 24 leading from the fuel pump 21. The pump is provided with eighteen cylinder and piston assemblies 25 and as indicated by the dashed lines 26, three of these cylinders spaced at 120° are arranged to feed into the single conduit 24a leading to a single combustor chamber to provide a substantially non-pulsating flow thereto. In this manner, variation of flow of fuel between combustion chambers is reduced to a minimum inasmuch as slight differences in fuel nozzle characteristics will not be so critical as they would be if there was but a single manifold leading to all chambers. The end result is that the fuel nozzle characteristics may vary between combustion chambers without having wide differences in temperature between the different chambers.

Fuel pump 21 is fed, as by gravity or by any other suitable means, through a solenoid operated normally open control valve 27 from a main oil supply tank, or tanks. If desired, and in order to take advantage of the less expensive heavier grades of fuel oil, one tank 28a may be used for a light grade of fuel oil suitable for starting, and, after combustion has started, the valves 27a and 27b may be manipulated to transfer to tank 28b having a heavier grade of less expensive fuel. Before shutting down the unit, the light grade fuel should again be used to flush the pump, fuel lines and fuel nozzles to prevent plugging of the fuel system.

A separate tank 28c is desirably provided for control oil to supply, through a normally open solenoid control valve 29, the control oil pump 20 which provides a supply of control oil to operate the hydraulic components of the regulating control system. Solenoid control valves 27 and 29 are adapted to be energized from a battery 30 and, through operation of the contacts 31 on overspeed governor 19, to cut off the supply of oil to both fuel pump 21 and control pump 20 in the event that the main regulating equipment for some reason fails to prevent the turbine operation from exceeding a safe maximum operating speed.

Main generator 23 comprises an armature 32 arranged in series with a commutating field winding 33. The generator has a separately excited shunt-type field winding 34 adapted to be energized by an exciter 35. Exciter 35 is arranged to be driven (as by placing it on a common shaft with the main generator 32) and is a direct current generator of the type described and claimed in U. S. Patent No. 2,297,992, issued January 7, 1941, upon an application of Ernest F. W. Alexanderson and Martin A. Edwards, and assigned to the assignee of the present invention. Such a generator is of the cross-armature-reaction-excited, direct-armature-reaction-compensated type, known as an amplidyne, and is provided with a pair of current supply brushes 36 and a pair of short-circuited brushes 37. A control field winding 38 is arranged to generate a voltage between the short-circuited brushes 37. The cross armature reaction of the current flowing through the short-circuited connection as a result of this voltage sets up a flux in such a direction as to provide an output voltage at load brushes 36 which is proportional to the excitation of the machine along its short-circuited axis. The field winding 39 is a series load compensating winding for neutralizing the armature reaction of the exciter load current. The field winding 40 (in the axis of the short-circuited brushes) is provided, in series with a capacitance 41, across the output of the exciter to neutralize the internal back coupling effect of alternating current oscillations between the exciter and its load. One of the desirable characteristics of an amplidyne generator of this type is that its output voltage responds very rapidly and with a high degree of amplification to any change in the energization of its control field winding.

The output circuit of the main generator is a series or loop circuit and it includes, besides the generator commutating pole winding 33, a plurality of motors 42, 43. It will be understood, of course, that representation of a pair of traction motors 42, 43 is purely diagrammatic and that there may be either a single motor or a group of motors arranged either in series or in parallel circuit relation, or adapted by conventional transition equipment to be selectively arranged in either series or parallel. Conventionally each such electric motor is adapted to drive a single wheel or axle when the gas electric system is applied to a traction vehicle.

It is desired to automatically regulate the main generator field excitation to provide optimum vehicle performance without exceeding (1) maximum available engine power, (2) maximum traction generator current (to prevent overheating generator or motors), or (3) maximum generator field current (to limit the generator voltage applied to the motors). In order to provide these desirable features, it is necessary that the amplidyne exciter, together with its associated control equipment, always provide the proper current for the separately excited field of the traction generator. Therefore, the input to the amplidyne control winding 38 is derived from a regulated source of voltage (hereinafter described) which is arranged to be bucked through a voltage dividing rheostat 44 arranged as a potentiometer across a constant source of voltage such as a twenty-five volt battery 45. This rheostat 44 is hereinafter referred to as the load control rheostat and it is actuated through a mechanical connection with a pinion 46 which rotates responsive to movement of the speed-responsive portion of the main regulator as hereinafter more fully explained. The excitation of amplidyne exciter control field winding 38 is also affected by the existing regulating source of voltage across a resistor 47 connected in series with the control field winding. The voltage across resistor 47 is produced by the rectified output of two magnetic amplifier circuits 48 and 49 each employing a pair of reactors 50. The reactors as illustrated each have a three-legged core with A.-C. windings on the two outer legs and a D.-C. winding on the center leg as indicated in Fig. 1 although various other forms known in the art may be utilized without departing from our invention in its broader aspects. The A.-C. windings create alternating flux in the outer parts of each reactor core and do not create flux in the center leg. Meanwhile the D.-C. windings create flux in all parts of each core and are used to saturate the core to varying degrees. Any saturation of the core varies the impedance of the associated A.-C. winding so that a pair of such reactors having their alternating current windings arranged in series provide a voltage dividing (and amplifying) circuit in which the voltage drop across the A.-C. windings associated with either reactor is proportional to the current in the D.-C. winding of that reactor compared with that in the D.-C. winding of the other reactor. The output is in series with one reactor and in series with the other, this output being taken from one leg of the A.-C. input and from the midpoint 51 between the two reactors. For amplifier circuit 48 this A.-C. output is rectified by the rectifier 52 and the commutated output of the rectifier is applied to the resistance 47 to control the voltage thereacross. Meanwhile a parallel circuit across resistance 47 is provided from the commutated output of similar rectifier 53, the input of which is derived from the magnetic amplifier 49.

The A.-C. windings 54 of the pair of reactors of amplifier 48 are connected in series with each other and across an alternating current source 55 which may conveniently comprise a separately-driven generator adapted to provide an A.-C. voltage of, for example, 400 cycles. An identical generator 55a provides A.-C. to the A.-C. windings 54 of amplifier 49. A D.-C. input to both magnetic amplifiers (48 and 49) is derived from a voltage dividing rheostat 56 (hereinafter referred to as the current limit rheostat) connected across a constant voltage source such as a battery 57. In the upper amplifier 48 this D.-C. input is compared to that (applied to D.-C. winding 58) derived from winding 58 being placed in series with the amplidyne exciter 35 output to main generator field winding 34. Of course, amplidyne 35 is responsive to the output of the amplifier 48 and in this manner the input from the current limit rheostat 56 (which is actuated by a mechanical connection to a throttle handle associated with another rheostat, as hereinafter explained) is compared with existing generator field current through the main generator field winding 34, so that when a change is initiated a follow-up is provided which will allow a balance to be obtained when the desired condition has been reached.

In the lower amplifier 49 the D.-C. input from current limit rheostat 56 is compared to that applied to winding 59 which is arranged across the main generator commutating field winding 33 so that the amplifier will be responsive to current variations in the loop circuit between generator 23 and motors 42 and 43. In this manner the lower reactor 49 acts as a voltage divider and amplifier responsive to a control quantity derived from the current limit rheostat 56 (according to positioning of throttle handle) and compared with the generator armature current then existing. Thus amplifier 49 serves to regulate in accordance with main generator (and traction motor current) while amplifier 48 serves to regulate in accordance with main generator voltage which is proportioned to exciter output current.

The main regulator, both for control of the rate of fuel feed to the gas turbine engine and for control of generator field excitation, operates through a main beam or lever arm 60. Actually main beam 60 has no fixed pivot, but for the purpose of considering the parts shown in Fig. 1 the point 61 may be regarded as being a fixed pivot for main beam 60 which is biased downwardly by a spring 62 and caused to move upwardly or counterclockwise about the pivot either by operation of a positioning motor 63 (responsive to movement of the throttle handle as hereinafter explained) or by operation of a speed-responsive servo mechanism 64 (responsive to load changes as hereinafter explained). Positioning motor 63 through a shaft 63a (see Fig. 2) is adapted to drive an eccentric cam 65 to raise or lower a push rod 66 provided with a roller 67 at its end adjacent cam 65 and provided at its upper end with a bifurcated portion 68 adapted to lift the main operating beam 60. If desired, in applications where remote operation of the system is not desired, cam 65 may be turned by hand.

As shown in Fig. 1, positioning motor 63 is provided with a split series field winding 70 for one direction of rotation and a split series field winding 71 to adapt the motor for rotation in the opposite direction. A normally closed limit switch 72 is provided between each field and the armature of the motor to limit the travel of cam 65. The armature and one or the other of the split series field windings (70 or 71) are energized selectively through the pair of reactors 73 and 74 which receive their A.-C. energization each from a suitable source of alternating current 75, which may be in certain applications a 400-cycle source, through a transformer 76. These reactors are adapted to feed through a plurality of opposed rectifiers 77 and to be saturated by permanently energized bias windings opposed and aided by a D.-C. input signal from a bridge circuit comprising positioning rheostat 78 connected across a battery 79 and a paralleled hand-operated throttle rheostat 80. The positioning or follow-up rheostat 78 is, through suitable gearing and spring-loading, as more fully explained in connection with Fig. 2, adapted to be driven by the positioning motor 63. Throttle rheostat 80 may be located at any convenient location (such as in the operator's cab in a locomotive application) and is mechanically tied in with the correct limit rheostat 56 so that the two operate together.

The combination just described of a remotely located rheostat, a follow-up rheostat, magnetic amplifiers and a positioning motor is more fully described and claimed in Patent 2,414,936, issued January 28, 1947, to Martin A. Edwards and Hugh M. Ogle, and assigned to the assignee of the present invention. As indicated in that patent, many additional windings can be placed on the center leg of each reactor in order to improve the characteristics of the magnetic amplifier. Of course, the follow-up feature is advantageous in that it provides that, for any throttle setting, the positioning motor will rotate the driven equipment until a point of balance has been reached in the electrical system at which time the motor will stop without the necessity of the operator doing anything further until he desires to make some other regulation. In the present application the throttle handle (and the throttle rheostat 80) is moved forward or back to electrically (through positioning motor operation) raise or lower the left end of lever arm 60 and thereby regulate the rate of fuel supplied to the gas turbine combustors as hereinafter explained.

The fuel pump 21 is a variable displacement pump (assumed to have an adjustable wobble plate hydraulically controlled as explained in patent application No. 718,580) (referred to above) and in order to regulate the output of this pump it is necessary to provide a fuel rate control pressure through a control pipe 81. Control oil supplied by the control oil pump 20 is forced into conduit 81 by a servomotor 82 comprising a spring biased power piston 83 operating in conjunction with a valve piston 84 which travels downward with downward movement of the associated end of main beam 60. It will be observed that valve piston 84 is a dumbbell-shaped valve member operating in a cylinder having an inlet port 85, an exhaust port 86 and an outlet port 87 all arranged so that with downward movement of valve piston 84 control oil from pump 20 will be forced into the slave cylinder in which piston 83 operates. Thereupon, pressure on power piston 83 will tend to restrain further movement of main beam 60 and at the same time will provide a pressure change in conduit 81 to move the fuel pump 21 wobble plate (not shown) to vary the rate of fuel feed to the combustors. With downward movement of valve piston 84, power piston 83 moves upward due to an increase of oil pressure thereby increasing the rate of fuel feed, whereas with upward movement of main beam 60 the supply from control pump 20 to the valve cylinder is cut off and the pressure in conduit 81 is relieved through port 86 to atmosphere so that the pump wobble plate can return to a position allowing less fuel to be pumped through the main pump 21 to the combustors.

Figure 2:
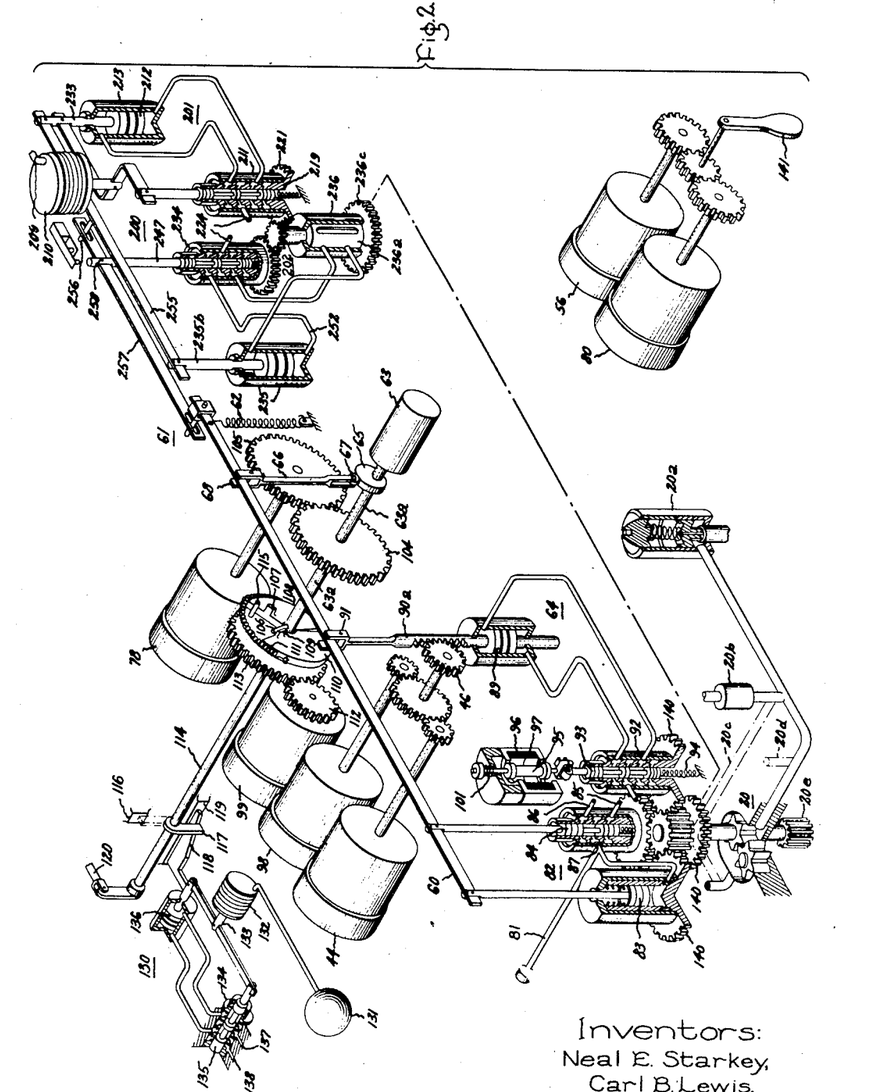
Fig. 2 is a perspective and partially cut-away functional mechanical diagram of the regulator portion of the equipment of Fig. 1 together with additional hydraulic equipment.

It is desirable to have the main regulator responsive to speed changes of the prime mover so that as the turbine slows down due to increase in load the regulator will act to allow more fuel to enter the engine whereby its speed will be brought back up to the condition existing before the time of change. This feature is provided through servomotor 64 comprising a slave cylinder 88 having a power piston 89 adapted to operate a lift rod 90 having a bifurcated end portion 91 (see Fig. 2) adapted to raise the main beam 60. This part of the control bears some features of similarity to that described in Patent 2,390,084, issued December 4, 1945, to Martin A. Edwards and assigned to the assignee of the present invention. The servomotor 64 comprises not only the reversible fluid pressure cylinder-piston 88—89, but a fluid control valve 92 connected to slave cylinder 88 by suitable inlet and outlet conduits. The control valve 92 includes a piston valve 93 formed to provide three spaced valve members biased upwardly by a compression spring 94. The piston valve is connected for downward actuation (against the spring bias) by a solenoid 95 having a main actuating or control winding 96 and a stabilizing winding 97. The power piston 89 is arranged to move a rack 90a which meshes with the pinion 46 to drive (through suitable gearing as shown in Fig. 2) the load control rheostat 44 previously described and a stabilizing rheostat 98 which acts as a voltage supply for the transient excitation of the solenoid stabilizing coil 97 through a capacitor 97a.

The stabilizing winding 97 is adapted to oppose overshooting and minimize hunting of the governor by being so arranged that it transiently opposes any movement of the fluid control piston valve 93 in response to change in energization of actuating control winding 96.

A further means responsive to load changes of generator 32 is used to prevent transient speed variations with sudden changes in load in the form of a transformer 102, resistor 103 and rectifier 103a. The primary of transformer 102 is connected in series with the generator 32 and the load circuit of motors 42—43. Any change in the transformer primary current will produce a secondary voltage. The secondary winding of transformer 102 is connected to the stabilizing winding 97 through the parallel combination of resistor 103 and blocking rectifier 103a. The combinations of resistor 103 and rectifier 103a permits the unsymmetrical adjustment of this control signal.

The solenoid control winding 96 is arranged in series with a rheostat 99 hereinafter referred to as the speed setting rheostat. The speed setting rheostat 99 is, through a lost motion device explained in connection with Fig. 2, operative in response to movement of the positioning motor 63 under certain conditions.

Engine speed is the basic function on which the regulator system is based and, as shown in Fig. 1, indication of speed is primarily obtained from the tachometer generator 18 which for simplicity is preferably of the rotating permanent magnet A.-C. induction type. The output of the tachometer is commutated by a three-phase full wave rectifier 100 to supply to the solenoid control winding 96 a solenoid force proportional to engine speed. This solenoid force is compared with a reference spring force provided by an adjustable biasing spring 101 and spring 94, and when the forces are equal, the pilot valve piston 93 is in its midposition and the system is in equilibrium. A load change causing a speed change causes the power piston 89 to act on either the engine fuel or generator excitation, or both, depending on the nature and magnitude of the load change. The system is restored to balance conditions by consequent operation of speed setting rheostat 99 which is arranged in series in the circuit from tachometer rectifier 100 to solenoid control winding 96.

Referring now to Fig. 2 it is seen that positioning motor 63 drives the shaft 63a to which is solidly affixed a gear 104 which meshes with a gear 105 which directly drives the positioning rheostat 78. Gears 104 and 105 may be provided with the same or with a different number of teeth dependent upon the ratio of transmission desired which in turn is dependent upon the physical arrangement of the various rheostat operating elements. As previously explained in connection with Fig. 1, the positioning rheostat 78 is effective as a follow-up rheostat in the circuit of the magnetic amplifiers associated with control of the positioning motor 63.

Positioning motor shaft 63a has rigidly mounted thereon a pin 106 adapted (for one direction of rotation) to move a dog or stop 107 formed integral with an arcuate segment 108 which is loosely mounted to be rotatable with respect to the shaft. Pin 106 is adapted (for opposite direction of rotation) to move a dog or stop 109 formed integral with an arcuate segment 110 which is also loosely mounted for rotation with respect to the shaft. Segments 108 and 110, respectively, are biased toward each other by a tension spring 111.

Speed-setting rheostat 99 is caused to follow operation of positioning motor 63 as follows: Speed-setting rheostat 99 is provided with a gear 112 (see Fig. 2) which is adapted to be driven by a gear 113 solidly affixed to a shaft 114 which may be referred to as the governor output shaft. A pin 115 on the gear 113 is caused to move (under certain conditions and not after maximum and minimum stop positions have been reached) by movement of dogs 107 and 109 following movement of pin 106 associated with positioning motor shaft 63a. A fixed minimum stop (which determines idling speed to prevent stalling) is provided by the stationary boss 116 which stops over-travel of output shaft 114 (provided with a dog 117) in a clockwise direction. Because of the action of tension spring 111, under normal conditions movement of either stop 107 or 109 will be followed by movement of the other because normally the spring holds the stops (and associated segments) compressed together upon pins 106 and 115. However, the condition shown in Fig. 2 is not a normal condition and, as shown, the regulator output shaft 114 is rotated as far as it can go in one direction and further rotation is stopped by an atmospheric stop 118 hereinafter explained and which operates to provide a maximum stop. The dog 117 is solidly affixed to shaft 114 and because of sliding movement of taped stop 118 (axially with respect to shaft 114) along a fixed boss 119, the dog 117 and tapered stop 118 serve to recalibrate governor maximum speed-setting as a function of ambient temperature as hereinafter explained. Meanwhile, a linkage 120, which is caused to move with rotation of output shaft 114, recalibrates the overspeed governor 19 (see Fig. 1) to change the speed at which this governor will operate to shut off fuel supplied to the gas turbine. However, the operation of centrifugal governor 19 is merely a safety precaution and it is intended that before this governor operates to shut down the system the electrohydraulic regulator associated with servomotor 64 will have operated to correct the overspeed condition as explained herein. It should be noted that the minimum and maximum stops 116 and 118 prevent movement only of speed-setting rheostat 99 and of the linkage 120 to the overspeed governor whereas the pin 106 (which is fixedly attached to the positioning motor shaft 63a) is not limited in its movement by these stops and is thus capable of a certain degree of overtravel beyond the maximum and minimum speed settings. During such overtravel the positioning rheostat 78 continues to move.

As previously stated, the operating characteristics of a gas turbine are greatly affected by ambient temperature changes. In a locomotive the prime mover must be adapted to operate at extreme high and low temperatures, the low sometimes reaching 40 degrees below zero, F. At such a temperature it has been estimated that there should be a 9 per cent reduction in maximum speed of a gas turbine over that allowable at normal temperatures and to provide a desirable recalibration in terms of ambient temperature the maximum speed stop 118 is varied by the non-electric control indicated generally at 130 (shown only in Fig. 2). This control adjusts the maximum allowable speed according to ambient temperature and comprises an ambient temperature bulb 131 which is so mounted (such as in turbine inlet casing 12 of Fig. 1) as to be subjected to outside temperatures and which is interconnected with a bellows 132. Bulb 131 and bellows 132 are filled with a gas (such as argon) having a suitable thermal coefficient of expansion and the linkage 133 from the bellows is caused to operate a pilot valve 134 which has three spaced valve members 135 adapted to operate a slave piston 136 to form a fluid pressure motor. Suitable fluid under pressure, such as oil from the control oil pump 20, is supplied to this servomotor through an inlet conduit 137 and is expelled from the motor to a sump (not shown) through an outlet conduit 138. This servomotor or control 130 serves to move the tapered maximum speed stop member 118 lengthwise with respect to shaft 114 thereby to recalibrate the maximum stop position (beyond which shaft 114 cannot rotate in the one direction) as a function of ambient temperature.

The principal control of the governor regulator mechanism is through the engine tachometer-generator 18 and through the servomotor control winding 96 already described in connection with Fig. 1. However, Fig. 2 shows additional mechanical modifications which may be desirable and which are not shown on the more elementary and electrical diagram of Fig. 1. For example, as shown in Fig. 2 the control oil pump 20 may be provided with a relief valve 20a and with a filter 20b for filtering the output from the pump. As indicated by dashed lines in Fig. 2, the pump may be provided with alternate piping 20c and 20d for re-arranging the connections to and from the pump in case of opposite rotation of the pump as driven by its pinion 20e.

As indicated in both Fig. 1 and Fig. 2, the power piston 83, valve piston 84, power piston 89, and cam lift rod 66, all operate on the main beam 60. The distances at which these members exert force on, or receive force from, the principal beam are carefully proportioned with respect to the pivot and the entire system is mechanically and electrically designed to provide proper leverage for each of these members.

As seen in Fig. 2, pivot point 61 is not fixed but is actually manually adjustable slidably along beam 60 and also controlled in an up and down movement by an additional control element represented generally at 200 to the right of the rest of the system. The object of control 200, which varies this pivot point 61 in an up and down relation, is to limit the rate of change of temperature to a predetermined value regardless of the rate of change of input signal. This control 200 also limits the maximum value of exhaust gas temperature, as well as providing rate of change thereof at a desired maximum rate. Control 200 is detailed and claimed in co-pending application Serial No. 25,504, filed May 6, 1948 in the name of Neal E. Starkey and assigned to the assignee of the present invention which application issued on October 31, 1950, as Patent No. 2,528,252.

It will be understood from reference to the above-identified Starkey application that the input conduit 209 may conveniently be from a temperature-responsive bulb (not shown) located in an exhaust housing (such as the turbine exhaust housing 16 of Fig. 1). As also outlined in that application, the control 200 consists of two major sub-combinations: the first comprises a pressure-responsive bellows 210 fed by conduit 209 and a servo system 201 (for amplifying the output of the bellows) comprising a pilot valve 211 and a piston 212 operating in slave cylinder 213. The pilot valve is provided with an operating piston having three spaced discs which are slidably disposed in the bore of a bushing 219 provided with a plurality of fluid ports and rotatably disposed in the cylinder 211 and provided at its lower end with a gear toothed portion 221 arranged to cause the bushing to rotate continuously during operation. Suitable fluid under pressure such as oil from the filter 20b of the control oil pump 20 is applied to the servomotor through inlet conduit 224. Expansion of the bellows 210 will operate the piston of the pilot valve 211 to cause movement of slave piston 212 to move its piston rod 233 with sufficient force to overcome any friction effects in the system.

As also detailed in the above last-mentioned Starkey application, the other sub-combination comprises a secondary servo system 202 having a secondary pilot valve 234 arranged to supply fluid pressure to a secondary power cylinder 235 and also having a flow restricting device 236. Pilot valve 234 is provided with a normally constantly rotating bushing driven by gears associated with the pinion 20e on the control oil pump shaft. Fluid from the pump is introduced through the conduit 224 to pilot valve 234 operative through its piston driven by rod 247. The upper output port of valve 234 communicates through conduit 252 to the lower end of the slave cylinder 235. The flow restricting device 236 comprises a slotted rotating bushing 236a driven by the gear 236c so that 236 operates as a chopper valve to restrict flow to the top end of slave cylinder 235.

It will be apparent from the drawing that the end of the secondary power piston rod 235b is pivoted to one end of balancing lever 255 which at its other end is pivoted to the rod 233 of primary power piston 212. An intermediate portion of the balancing lever 255 carries a connecting pin 256 engaging a slot in the end of a lever 257 which acts as the output lever for the control 200. This output lever is pivoted at 258 to the upper end of the secondary pilot spindle 247 and at its extreme left-hand end it bears against the pivot 61 of the main beam 60 to affect (through servomotor 82) the rate at which fuel is supplied to the gas turbine.

In order to facilitate sliding motion of the various pistons in their respective cylinders by assuring that only kinetic and not static friction is to be overcome, it may be found desirable to provide bushings on the main regulators which are continuously rotated like those of auxiliary regulator 200, and in Fig. 2 we have shown the cylinders housing pistons 83, 84, and 93, respectively, each provided with a ported bushing formed integral with a gear section 140 adapted to be continually rotated as by a gear associated with the control oil pump shaft driven by pinion 20e.

As explained in connection with Fig. 1, throttle rheostat 80 and current limit rheostat 56 are mechanically tied together. As illustrated in Fig. 2, this is conveniently done by gearing each of these rheostats to be actuated responsive to movement of the throttle operator's handle 141.

It will be understood that in operation any setting of the hand-operated throttle rheostat 80 will, through operation of the positioning motor 63, control the speed-setting rheostat 99 of the speed-responsive apparatus associated with the regulator and thus recalibrate the fluid motor 64 (comprising valve piston 93 and slave piston 89) to maintain substantially constant the speed of engine 11 at the desired setting. Since any speed change will be accompanied by an available engine horsepower change, the piston 89 (through rack 90a and pinion 46) is arranged to operate load control rheostat 44. This rheostat or potentiometer is provided with a "dead" section 44a (Fig. 1) over which it effects no change of potential on its slider with respect to ground. When the rheostat operates on this dead section, the governing element 64 regulates fuel and the excitation to the exciter 35 is a maximum unless modified by control elements 48 and 49 (Fig. 1).

It will be evident that the fluid motor 63 acting on the main beam through bifurcated lifting portion 91 will regulate to maintain engine speed at any desired point. For example, if the engine speed increases for any reason, the energization of the governor actuating winding 96 will be increased and the control piston 93 will be moved downward to establish communication from the control oil supply to the bottom of slave cylinder 88 and, at the same time, allow oil from the top of cylinder 88 to exhaust through the bottom sump connection on the control valve 93, thereby to raise the pivot point 91 and also raise valve piston 84 and power piston 83 to decrease the pressure in conduit 81 and thereby vary the output of constant displacement fuel pump 21 to reduce the speed of operation of the gas turbine. If, on the other hand, the engine speed decreases below its desired value the bias differential between the solenoid force and the reference spring forces will cause servo piston 89 to operate downward and with this reverse action the fuel pump wobble plate is moved so that more fuel will be supplied to the engine.

If the load upon the engine is so great that even after the governor has moved the throttle to its full open position (as determined by ambient temperature stop 118) the engine is still unable to maintain the desired speed, the regulator will no longer control the fuel, but will control the load on generator 32 adjusting the load control rheostat 44 to reduce the excitation of the governor exciter and hence that of main generator field 36. Such reduction of generator excitation reduces the load upon the engine to permit it to attain the desired speed.

Through the magnetic amplifiers 48 and 49 the exciter control field winding 38 is energized in accordance with movement of the current limit rheostat 56 as well as in accordance with the magnitude of current in the exciter output circuit and differentially in accordance with the magnitude of current in the generator output circuit.

Even though any turbine speed change results in change of control oil pump (28) speed, with the controls herein described any increase in load results in increasing the quantity of fuel injected and any decrease in load reduces the quantity of fuel injected with the result that constant speed is maintained for a given speed setting of the throttle rheostat 80 and at the same time that this corrective adjustment in fuel supply is made, the generator voltage is adjusted to restore the load on the prime mover to a proper value.

The electrical drive is in effect a variable transmission with an infinite number of ratios and with the control described the equipment automatically adjusts itself to all important conditions to that the gas turbine can always operate in its most efficient speed range with full horsepower available for all load conditions.

With the described system the limitation of maximum gas turbine power is met by automatically reducing the generator excitation whenever the gas turbine load (i. e. the generator demand for power) exceeds the power available from the turbine. The magnetic amplifier systems not only serve to suitably amplify such minute quantities as the voltage drop across the generator commutating pole field to suitable values for controlling excitation of the exciter but also serve to isolate the main power circuits from the control circuit so that the equipment may continue to operate with a single fault in the control circuits.

Remote operation of the control is facilitated because the throttle handle operates only electrical devices (i e., rheostat 80 and rheostat 56) which may be conveniently remotely located, as in an operator's cab distant from the remainder of the electrohydraulic regulator system.

One important feature of our invention resides in providing maximum temperature control responsive to intake air temperatures in combination with a rate of change of temperature control responsive to exhaust gas temperature changes. The maximum temperature limit reduces the fuel when a certain maximum ambient temperature is reached, and the rate of change of temperature control will allow sudden changes of temperature within certain limits but if these limits are exceeded the control acts to change the fuel feed. The overspeed governor is also recalibrated at the same time so that if the main speed governing equipment should fail there will still be a limitation of overspeed as a function of preset speed. But regardless of variation of temperature or other factors (such as altitude or grade of fuel) the system described always provides maximum power output since gas turbine speed is always the basic function on which the governing system is based.

There is thus provided a device of the character described capable of meeting the objects hereinabove set forth and providing, for a gas turbine electric drive, speed control with small transient regulation over a wide speed range, load control to match generator demand and gas turbine ability, and fuel limit as a function of turbine speed, temperature and rate of change of temperature.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. In a regulating system for a prime mover, a first fluid pressure motor comprising a slave cylinder and piston and a pilot cylinder and piston with said pilot piston connected to be responsive to speed of said prime mover, control fluid supply means connected to said first fluid pressure motor, a beam member having a pivot point and connected to pivot responsive to at least one direction of movement of said slave piston, a positioning motor connected to be responsive to supervisory control, said beam member connected to also pivot responsive to at least one direction of movement of said positioning motor, a second fluid pressure motor connected to be mechanically actuated by movement of said beam member, control fluid supply means connected to said second fluid pressure motor, a pressure fluid conduit leading from said second fluid pressure motor and thereby having the pressure therein adapted to be varied by said second fluid pressure motor through actuation of said beam member, a fuel pump of the variable displacement fluid pressure controlled type connected to said conduit to be adjusted by the pressure therein, means for driving said pump, and fuel supply means leading to said pump and leading from said pump to said prime mover, whereby the fuel supplied to said prime mover may be regulated according to prime mover speed change and according to supervisory control through the application of forces at predetermined distances from the pivot of said beam member.

2. In a regulating system for a vehicle having a gas turbine prime mover and a direct current generator connected to be driven by said turbine and arranged to supply current to a traction motor, means including a servomechanism for controlling the fuel input to said turbine, means including a main beam having a pivot point and for actuating said servomechanism, a second servomechanism arranged to operate said main beam, electromagnetic means responsive to the speed of said prime mover for actuating said second servomechanism, a positioning motor arranged to operate said main beam, manually operable control connected to initiate operation of said positioning motor, a separately excited field winding for said direct current generator, means including an exciter having a field winding, and connected to said separately excited generator field winding for varying the excitation of said generator, means including a rheostat in circuit with said exciter field winding and arranged responsive to movement of said second servomechanism for varying the excitation of said exciter, means including a rheostat connected to be responsive to actuation of said manually operable control and connected in circuit to vary the excitation of said exciter, a rheostat connected in circuit with said electromagnetic means, means including a shaft for setting said rheostat in the circuit of said electromagnetic means for setting the speed at which said means will actuate said second servomechanism, a fixed minimum speed stop operatively associated with said shaft for preventing rotation thereof in one direction beyond a predetermined point, a maximum speed stop operatively associated with said shaft for preventing rotation thereof in the opposite direction, means positioned to be responsive to ambient temperature for varying said maximum speed stop, and means for rotating said shaft between the limits imposed by said stops responsive to movement of said positioning motor, whereby there is provided a temperature compensated fuel rate and load control for said turbine.

3. In a regulating system for a vehicle having a gas turbine prime mover and a direct current generator connected to be driven by said turbine and to supply current to a traction motor, means including a first servomechanism for controlling the rate of fuel input to said turbine, a main beam having a pivot point, means including a connection to said main beam for initiating operation of said servomechanism, a second servomechanism arranged to operate said main beam, electromagnetic means arranged to be responsive to the speed of said prime mover and connected to operate said second servomechanism, an electrically operated positioning motor arranged to operate said main beam, supervisory means including a first rheostat electrically connected in the circuit of said positioning motor for operating said motor, said first rheostat being adapted to be hand operated, a field winding for said direct current generator, means including an exciter connected to said generator field winding for varying the excitation of said generator, a field winding for said exciter, means including a second rheostat for varying the excitation of said exciter, said second rheostat electrically connected in circuit with said exciter field winding and mechanically connected to be responsive to movement of said second servomechanism, means including a magnetic amplifier and a third rheostat for additionally varying the excitation of said exciter differentially with respect to the output thereof, said magnetic amplifier comprising a plurality of saturable reactors each adapted to be energized by alternating current and adapted to be saturated in varying degree by direct current to provide an amplified output responsive to direct current changes, means for energizing said reactors with alternating current, means including a direct current source in circuit with said third rheostat for saturating at least one of said reactors responsive to movement of said third rheostat, a mechanical connection to said third rheostat to adapt it to operate responsive to movement of said hand operated first rheostat, an electrical connection in the circuit of said exciter and said generator field winding for saturating another of said reactors responsive to output of said exciter, means including a rectifier connected in the circuit of the amplified output of each of said reactors for producing a direct current voltage proportional to the difference in saturation of said reactors, connections from said rectifier to the circuit of said exciter field winding for varying the current intensity therein, a fourth rheostat connected in the circuit of said electromagnetic means arranged responsive to the speed of said prime mover, means including a mechanically calibrated overspeed governor connected to be driven by said turbine, means including a connection from said overspeed governor to cut off the supply of fuel to said turbine, means including a shaft to recalibrate said overspeed governor and to set said fourth rheostat, a fixed minimum speed stop operatively associated with said shaft for preventing rotation thereof in one direction beyond a predetermined point, a variable maximum speed stop operatively associated with said shaft for preventing rotation thereof in the opposite direction, means positioned to be responsive to ambient temperature changes and connected to vary the setting of said variable maximum speed stop, means for rotating said shaft within the limits of said stops responsive to movement of said positioning motor, and means positioned to be responsive to rate of change of temperature at the exhaust of said turbine for varying the pivot point of said main beam.

4. In a regulating apparatus for a prime mover having means for supplying fuel thereto, and a manually operable accelerator, means associated with said fuel supplying means for controlling the rate of fuel input to said prime mover responsive to prime mover load changes and responsive to accelerator position changes, means associated with said fuel supplying means and arranged to be responsive to prime mover speed for limiting the maximum speed at which said prime mover may operate, means responsive to ambient temperature changes for varying said maximum speed limiting means, and means positioned to be responsive to rate of change of temperature in a portion of said prime mover and arranged to modify the relation between said rate of fuel input controlling means and prime mover load changes and accelerator position changes thereby to prevent sudden temperature changes in said prime mover beyond predetermined rate of change limits.

5. In a hydraulic-electrical regulating system for a gas turbine electric locomotive having a gas turbine prime mover and hydraulic means for varying the rate of fuel feed to said turbine and having a main generator mechanically connected to be driven by said prime mover and provided with a field winding, throttling means for manually actuating said hydraulic means for varying rate of fuel feed, means for producing variable generator excitation through said field winding, generator current limiting means arranged to vary said generator excitation responsive to actuation of said throttling means differentially with respect to the current output of said generator, generator voltage limiting means arranged to vary said generator excitation responsive to actuation of said throttling means differentially with respect to preexisting generator excitation, a tachometer generator connected to be driven by said turbine, electromagnetic means arranged to be responsive to output of said tachometer generator, hydraulic means arranged to be responsive to said electromagnetic means, and connected to additionally vary said hydraulic means for varying rate of fuel feed, speed-setting means comprising a rheostat arranged in the circuit of said electromagnetic means and arranged responsive to actuation of said throttling means within predetermined limits comprising a minimum speed stop and a maximum speed stop, stabilizing means arranged responsive to speed of actuation by said electromagnetic means proportionately to transiently oppose the controlling action of said electromagnetic means, and means positioned to be responsive to ambient temperature changes for recalibrating said maximum speed stop.

6. In a hydraulic electrical regulating system for a gas turbine electric locomotive having a gas turbine prime mover having a fuel input and an exhaust and hydraulic means for varying the rate of fuel feed to said turbine and having a main generator mechanically connected to be driven by said prime mover and provided with a field winding, a tachometer generator arranged to be driven by said turbine, an overspeed governor adapted to be mechanically adjusted and arranged to be driven by said turbine, means for completely cutting off fuel feed to said turbine responsive to actuation of said overspeed governor at a speed predetermined by said mechanical adjustment, means including an amplidyne exciter for exciting said main generator through said field winding, throttling means for manually initiating actuation of said hydraulic means for varying rate of fuel feed, current limiting means for varying said generator excitation responsive to actuation of said throttling means differentially with respect to the value of said excitation and with respect to the output of said generator, electromagnetic means arranged responsive to output of said tachometer generator and adapted for one direction of movement and within certain limits to actuate said hydraulic means for varying rate of fuel feed, speed setting means comprising a rheostat arranged in the circuit of said electromagnetic means and arranged to be responsive to actuation of said throttling means within limits comprising a minimum speed stop and a maximum speed stop, stabilizing means arranged responsive to speed of actuation by said electromagnetic means proportionately to transiently oppose the controlling action of said electromagnetic means, load control means for varying said generator excitation responsive to controlling action of said electromagnetic means and said stabilizing means, means arranged to be responsive to ambient temperature changes and including a bellows operated fluid pressure motor for recalibrating said maximum speed stop, and rate of change of temperature responsive means comprising an input member positioned in accordance with changes in temperature in said prime mover exhaust and comprising an output member positioned in accordance with changes in position of said input member, with said rate of change of temperature responsive means output member connected to limit the response of said hydraulic means for varying rate of fuel feed to movement of said manually actuated throttle means and to movement of said electromagnetic means arranged responsive to tachometer generator output.

7. A control system for a prime mover driven electric generator connected to supply energy to a load circuit, said control system comprising hydraulic means for varying the rate of fuel feed to said prime mover, a separately energized field winding for said generator, a tachometer generator arranged to be driven by said prime mover, throttling means including a hand-operated rheostat arranged in circuit with a positioning motor for manually initiating actuation of said hydraulic means for varying rate of fuel feed, a positioning rheostat arranged responsive to actuation of said positioning motor and arranged in the circuit thereof to provide a follow-up characteristic, a saturable core type magnetic amplifier in the circuit between said positioning motor and said hand-operated rheostat and said positioning rheostat, means including an exciter machine for exciting said separately energized generator field winding, means for varying said generator excitation responsive to actuation of said throttling means differentially with respect to existing values of generator excitation, said current-limiting means including a rheostat and a saturable core type magnetic amplifier arranged to affect excitation of said exciter machine, speed setting control means including a solenoid-operated fluid pressure valve arranged responsive to output of said tachometer generator, and including a power piston hydraulically connected to be operated by movement of said solenoid valve and mechanically connected to actuate said hydraulic means for varying rate of fuel feed, a speed-setting rheostat connected in the circuit of said solenoid and arranged to be responsive to actuation of said positioning motor, stabilizing means comprising a capacitor and a rheostat arranged to be actuated by said speed-setting control means power piston and to energize said solenoid through said capacitor to transiently oppose the primary controlling action of said solenoid, load control means for varying said generator excitation responsive to actuation of said speed-setting means, rate of change of temperature responsive means arranged to be responsive to internal turbine temperature and for limiting the rate of change of fuel feed to said prime mover, a variable displacement fuel pump mechanically connected to be driven by said prime mover and associated with said hydraulic means for varying the rate of said fuel feed, a plurality of combustion chambers in said prime mover, a plurality of chambers in said fuel pump, and a conduit to each of said combustion chambers from a different plurality of said pump chambers.

8. A control system for a prime mover driven electric generator connected to supply energy to a load circuit, said control system comprising means for varying the rate of fuel feed to said prime mover, throttling means including an electric positioning motor for actuating said means for varying rate of fuel feed, a manually operated rheostat connected in the circuit of said positioning motor for initiating operation thereof, a field winding for said generator, means including an exciter for energizing said field winding, generator current-limiting means connected to vary said generator excitation responsive to actuation of said throttling means differentially with respect to existing values of generator excitation, said current-limiting means including a magnetic amplifier arranged to affect said generator excitation, a tachometer generator arranged to be driven by said prime mover, speed-setting means including a solenoid-operated valve arranged to be responsive to output of said tachometer generator, a power piston hydraulically connected to be operated by movement of said solenoid valve and mechanically connected to actuate said first-mentioned means for varying rate of fuel feed, a speed-setting rheostat arranged in the circuit of said solenoid and arranged to be responsive to actuation of said positioning motor, load control means including a rheostat connected to vary said generator excitation responsive to actuation of said speed-setting means, ambient temperature-responsive means for determining the maximum load at which said prime mover may operate, rate of change of turbine temperature-responsive means for determining the rate of change of fuel feed at which said prime mover may operate regardless of rate of change of input signal from said temperature-responsive means, a variable displacement fuel pump adapted to be driven by said prime mover and associated with said means for varying the rate of fuel feed, a plurality of combustion chambers in said prime mover, and a plurality of fuel pump piston chambers associated with each of said combustion chambers.

9. In a regulating apparatus for a prime-mover electric power system, the combination of first means for manually regulating both the rate of fuel feed to said prime mover and the maximum permissible load thereon, second means arranged to be responsive to the speed of operation of said prime mover and for additionally regulating both the rate of fuel feed to said prime mover and the maximum permissible load thereon, and third means positioned to be responsive to temperature changes in a portion of said prime mover, with said third means connected to vary the limits within which said first and second means will be operative to regulate rate of fuel feed and maximum permissible load of said prime mover.

10. In a regulating apparatus for a prime mover, the combination of control means arranged to regulate rate of fuel feed to said prime mover, control means arranged to be responsive to change of speed of said prime mover, control means arranged to be responsive to manual supervision, control means arranged to be responsive to temperature in a portion of said prime mover, control means arranged to be responsive to rate of change of temperature in a portion of said prime mover, and means for interconnecting all of said control means.

11. In a power system in which a gas turbine is connected to drive a generator connected to supply an electrical load, first means for supplying fuel at an adjustable rate to said gas turbine, second means for supplying air to said gas turbine, third means for conducting spent exhaust gases from said turbine, fourth means arranged to be responsive to speed of said gas turbine and connected to adjust said first means for increasing rate of fuel feed with decrease of turbine speed, fifth means positioned to be responsive to temperature of air supplied through said second means and connected to limit as a function thereof the effect of said fourth means on said first means, and sixth means positioned to be responsive to rate of change of temperature of exhaust gases in said third means for additionally limiting as a function thereof the effect of said fourth means on said first means.

12. In a power system in which a gas turbine is arranged to drive a generator connected to supply an electrical load, first means for supplying fuel and air to said turbine, second means operatively associated with said generator and arranged to be responsive to speed change of said prime mover for matching the maximum power which can be required by said generator with the existing ability of said turbine to deliver power thereto, and third means positioned to be responsive to change of temperature of air supplied through said first means and arranged to recalibrate said second means, whereby the matching of generator demand as a function of engine speed change with load change may be at a rate predetermined by air intake temperature.

13. In a control system for a prime mover electric generator combination having means for varying the rate of fuel feed to said prime mover, a solenoid operated control connected to adjust said means for varying rate of fuel feed, a tachometer generator arranged to be driven by said prime mover, a control winding for said solenoid connected in circuit with said tachometer generator to be energized therefrom in accordance with speed of said prime mover, a stabilizing winding for said solenoid, means including a capacitor connected in circuit with said stabilizing winding for transiently energizing said stabilizing winding from said tachometer generator responsive to change in speed of said prime mover, inductive means connected to be responsive to current in said electric generator and means including a paralleled resistance and blocking rectifier interconnecting said inductive means and said stabilizing winding for transiently energizing said winding responsive to change of load on said prime mover.

14. In a locomotive having a plurality of traction motors, at least one main generator having a load circuit connected to supply at least one of said traction motors, a gas turbine prime mover connected to drive said generator, a fuel pump connected to be driven and to supply fuel to said prime mover, first means associated with said pump and arranged to vary the stroke thereof, a beam arm having a pivot point and having a connection arranged to actuate said first means for varying the stroke of said pump thereby to vary the rate of fuel feed with movement of said beam arm about said pivot, a tachometer generator connected to be driven by said prime mover, second means including an electromagnet connected in circuit with said tachometer generator to be responsive to a predetermined speed of said turbine, third means connected to said second means and arranged to contact said beam arm for causing actuation of said beam arm responsive within limits to one direction of actuation of said second or speed responsive means, a first rheostat connected in circuit with said electromagnet for resetting the speed to which said second means will be responsive, a second rheostat located in said locomotive at a position remote from said beam arm and which is arranged to be manually operated for supervisory control, fourth means electrically interconnected with said second rheostat and mechanically connected to said beam arm for moving said beam arm responsive within limits to movement of said manually operable rheostat, fifth means spring biasing said beam arm against the forces initiated by either said third means actuating said beam arm or said fourth means actuating said beam arm, a field winding for said generator, sixth means including a source of direct current for energizing said field winding, a third rheostat connected in circuit with said source and thereby adapted to vary the energization of said field winding, a magnetic amplifier circuit having an output also connected in circuit with said source of direct current and thereby adapted to additionally vary the energization of said field winding, an alternating current source connected to supply constant A.-C. energization to said magnetic amplifier circuit, a source of direct current energization connected to said magnetic amplifier circuit to affect saturation therein, seventh means including a fourth rheostat connected in circuit with said last-mentioned source of D.-C. energization for controlling saturation, eighth means connected in said main generator load circuit and associated with said magnetic amplifier circuit to additionally control the action thereof responsive to current in said load circuit, means associated with said magnetic amplifier circuit and connected in the circuit of the first-mentioned source of direct-current to additionally control the action of said magnetic amplifier circuit responsive to generator voltage, mechanical means associated with said fourth means and mechanically connected to drive said speed re-setting first rheostat as a function within predetermined limits of the manual movement of said second rheostat, mechanical means associated with said speed responsive second means and connected to drive said third rheostat as a function of movement of said electromagnetic speed responsive means, and mechanical means connecting said fourth rheostat to be moved responsive to movement of said second rheostat, whereby there is provided for said locomotive a gas turbine fuel rate and generator load and voltage regulator which is adapted to operate either responsive to supervisory control or responsive to engine speed change due to load change thereby permitting use of the lowest possible engine speed commensurate with power requirements thereby to minimize engine wear and fuel consumption.

NEAL E. STARKEY.
CARL B. LEWIS.
MARTIN A. EDWARDS.

REFERENCES CITED

The following references are of record in the file of this patent:

UNITED STATES PATENTS

| Number | Name | Date |
|---|---|---|
| 1,981,618 | Faverty | Nov. 20, 1934 |
| 2,263,705 | Seippel | Nov. 25, 1941 |
| 2,297,992 | Alexanderson et al. | Jan. 7, 1941 |
| 2,336,232 | Doran | Dec. 7, 1943 |
| 2,390,084 | Edwards | Dec. 4, 1945 |
| 2,393,622 | Adams et al. | Jan. 29, 1946 |
| 2,411,065 | Silvester | Nov. 12, 1946 |
| 2,414,936 | Edwards et al. | Jan. 28, 1947 |
| 2,432,177 | Sedille | Dec. 9, 1947 |
| 2,499,232 | Strub | Feb. 28, 1950 |